(12) United States Patent
Masson et al.

(10) Patent No.: US 8,753,465 B2
(45) Date of Patent: Jun. 17, 2014

(54) METHOD FOR MANUFACTURING COMPOSITE PARTS COMPRISING BRAIDED FIBERS

(75) Inventors: Richard Masson, Les Loges en Josas (FR); Mathieu Gouret, Vernon (FR); Romain Boudier, Versailles (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 169 days.

(21) Appl. No.: 13/517,919

(22) PCT Filed: Jan. 19, 2011

(86) PCT No.: PCT/EP2011/000199
§ 371 (c)(1),
(2), (4) Date: Jun. 20, 2012

(87) PCT Pub. No.: WO2011/095278
PCT Pub. Date: Aug. 11, 2011

(65) Prior Publication Data
US 2012/0255668 A1    Oct. 11, 2012

(30) Foreign Application Priority Data

Jan. 22, 2010  (FR) .................................... 10 50418
Sep. 6, 2010  (FR) .................................... 10 57073

(51) Int. Cl.
*B29C 70/88*  (2006.01)

(52) U.S. Cl.
USPC ........... 156/148; 156/149; 156/191; 156/250; 156/272.8

(58) Field of Classification Search
CPC .................................................. B29C 70/887
USPC ......... 156/148, 149, 137, 174, 175, 189, 250, 156/272.8, 191
See application file for complete search history.

(56) References Cited

U.S. PATENT DOCUMENTS

| 5,487,806 A * | 1/1996 | Viellard ........................ 156/175 |
| 2008/0145615 A1 | 6/2008 | Jacobsen et al. |
| 2009/0223588 A1 | 9/2009 | Dunleavy |

FOREIGN PATENT DOCUMENTS

| FR | 2 893 532 A1 | 5/2007 |
| WO | 2006/015598 A1 | 2/2006 |

OTHER PUBLICATIONS

International Search Report of PCT/EP2011/000199, dated Jun. 6, 2011.

* cited by examiner

*Primary Examiner* — Jeff Aftergut
(74) *Attorney, Agent, or Firm* — Sughrue Mion, PLLC

(57) ABSTRACT

A method of fabricating a composite material part such as a link. The method comprises the successive operations of applying reinforcing fiber layers (14a, 14b, 14c) that are braided around a mandrel over all or part of the length of the mandrel, the layers being superposed one on another. The method includes a step of cutting an intermediate reinforcing fiber layer (14a, 14b, 14c) after it has been applied, a step of withdrawing a cut portion prior to applying the following braided layer (14b, 14c), thereby locally building up an extra thickness of reinforcing layers on each portion of the cut layer that has remained in place, the extra thickness constituting local reinforcement of the part. Resin is subsequently injected into the various braided layers prior to the resin being polymerized in order to prepare a blank. The method applies in particular to the field of aviation.

7 Claims, 4 Drawing Sheets

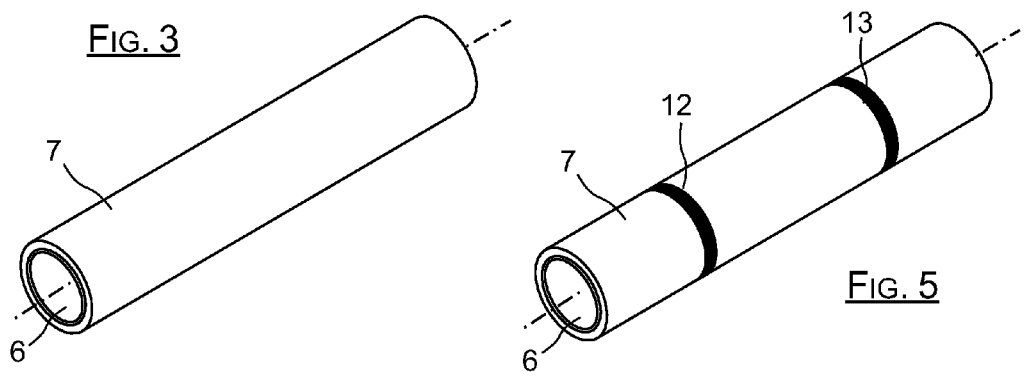
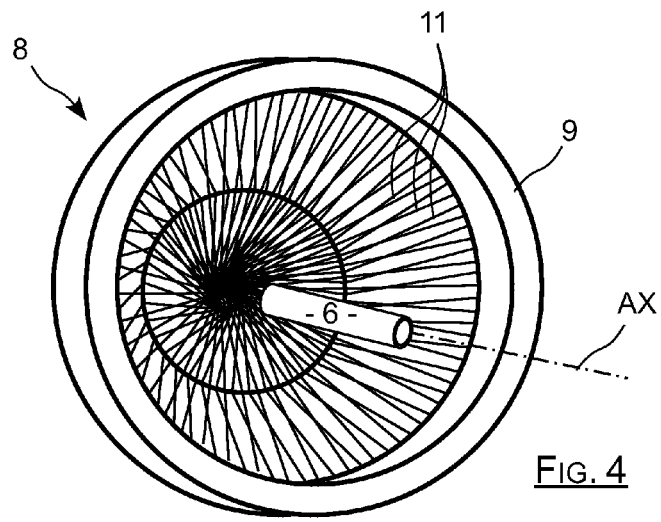
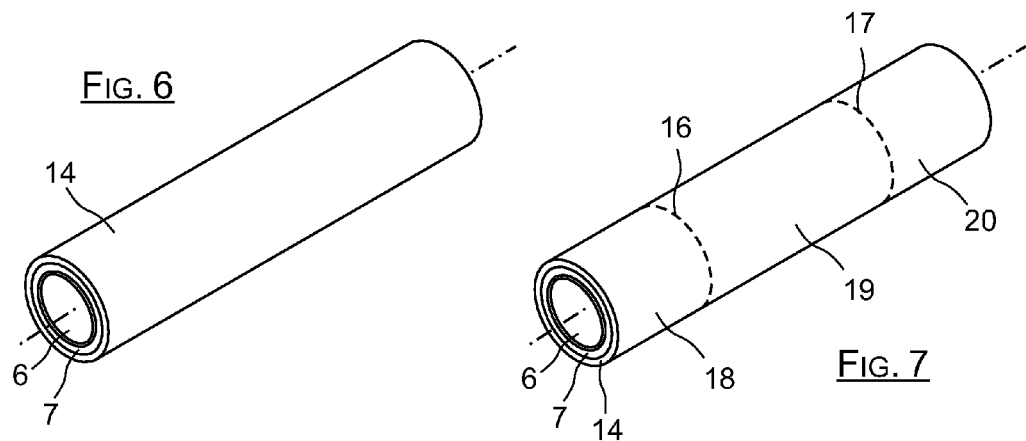

FIG. 11
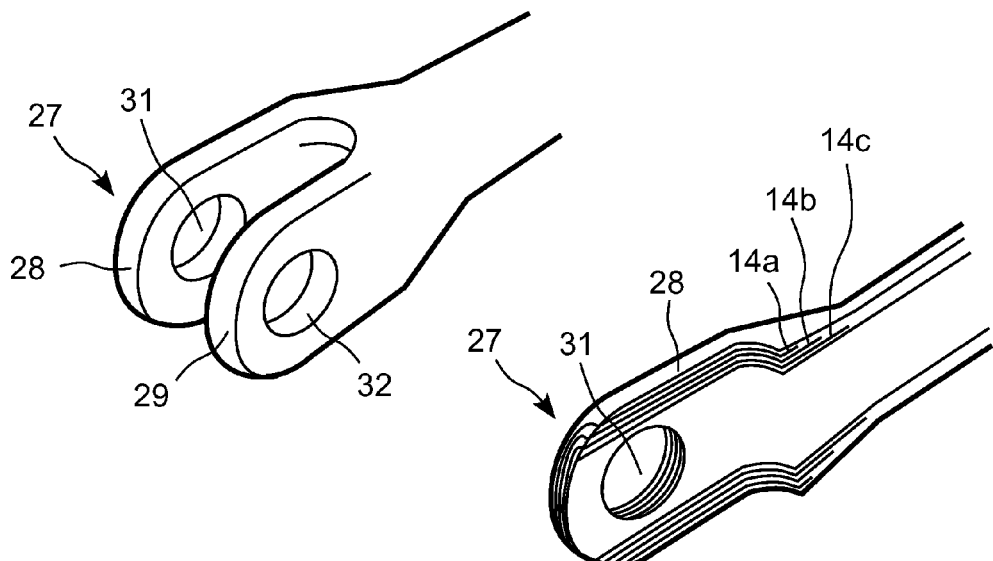
FIG. 12
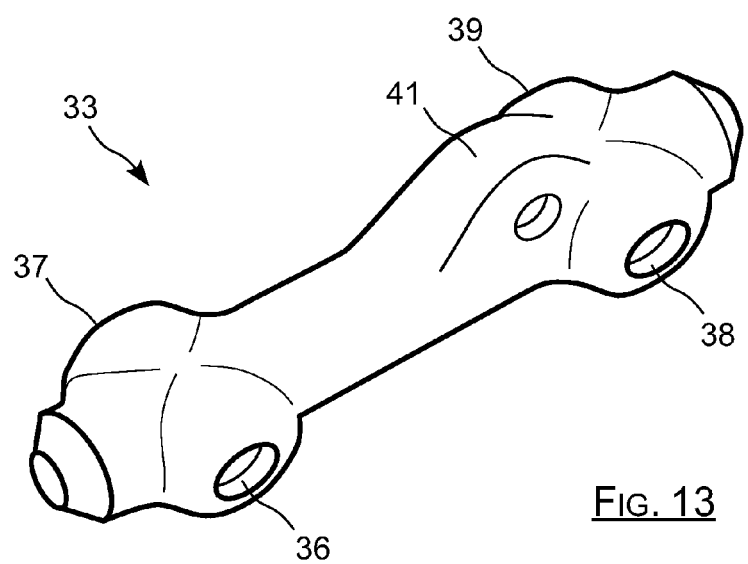
FIG. 13

METHOD FOR MANUFACTURING COMPOSITE PARTS COMPRISING BRAIDED FIBERS

CROSS REFERENCE TO RELATED APPLICATION

This application is a National Stage of International Application No. PCT/EP2011/000199 filed Jan. 19, 2011, claiming priority based on French Patent Application Nos. 10 50418, filed Jan. 22, 2010, and 10 57073, filed Sep. 6, 2010, the contents of all of which are incorporated herein by reference in their entirety.

The invention relates to a method of fabricating a composite material part, in particular a link made of composite material and comprising a main body including a portion such as an end that is reinforced in order to withstand a mechanical stress concentration.

BACKGROUND OF THE INVENTION

Such a link, as shown in FIG. 1 where it is referenced 1, comprises a generally tubular hollow main body 2 that is extended at each of its ends by a clevis, the clevises being given references 3 and 4 in this example.

Each clevis 3, 4 comprises two prongs referenced 3a & 3b and 4a & 4b, all of which are constituted by a thickness of composite material that is greater than the nominal thickness of composite material in the remainder of the link. The two prongs of each clevis extend parallel to the general direction AX of the hollow main body, and each prong includes a bore in which a metal bearing is mounted.

In a method known from patent document FR 2 893 532, the link is fabricated from a piece of reinforcing fiber fabric that is cut to have a shape as shown in FIG. 2.

This shape comprises a central portion for the hollow main body 2 and four extensions, each corresponding to a respective clevis prong.

The fabric used is a carbon fiber fabric of constant thickness, and it is of the two-and-a-half-dimensional (2.5D) type, i.e. it comprises a plurality of layers of superposed woven fibers, which layers are linked to one another by linking fibers also referred to as transverse fibers.

The fabrication of that link consists in folding the FIG. 2 piece of fabric around a mandrel or the like, and then injecting resin into the reinforcing fiber fabric and then baking the assembly in order to polymerize the resin.

The thickness of the clevises is increased before the fabric is shaped, by cutting the interlinking fibers of the base layers of the 2.5D fabric in the clevises so as to separate the base layers locally from one another.

Intermediate layers are then inserted locally between the separated base layers, thereby enabling the thickness to be increased locally. After adding the intermediate layers, so-called "transverse" fibers are passed through the assembly in order to secure all of the layers to one another.

The prongs of each clevis are thus of thickness that is significantly greater than the thickness of the remainder of the link, thereby increasing the mechanical strength the clevis can oppose against the forces exerted along the direction AX. These forces are the result of the normal loading of the link when its clevis is mounted on a pin (not shown in the figures).

In practice, although that method of fabrication is satisfactory in terms of the mechanical strength of the resulting link, it is nevertheless constraining in terms of its implementation insofar as it depends very greatly on the know-how of the operator performing it.

Parts are also known that are fabricated with the help of a hollow mandrel that is passed through the central orifice of a braiding machine so as to cover the mandrel in one or more layers of braided fibers. A resin is then injected into the assembly and polymerized.

Nevertheless, the braiding method gives rise to constraints on the design of the parts, which parts must in particular avoid having any sudden changes of section.

Unfortunately, with parts that are highly stressed, it is common practice for them to have local extra thicknesses in stress-concentration zones. This applies in particular to landing gear rocker levers that need to include bearings for receiving an axle. The bearings project on either side of the body of the rocker lever and they co-operate with the body to form transition zones having a sudden change of section. Such a rocker lever can be made by braiding only with a mandrel that presents little variation of section and that would require an extra thickness of material to be provided over the entire part, thereby increasing its weight and its bulk.

Proposals are made in document FR 2 890 591 to provide a part having a fiber preform that is reinforced by strips of preimpregnated single-directional fiber fabric extending in a longitudinal direction of the part in order to reinforce said parts, in particular in compression.

Nevertheless, putting such strips into place is very difficult in terms of ensuring that a proper orientation and density of fibers is conserved in order to guarantee the mechanical strength of the part. Unfortunately, there is a considerable risk of geometrical defects that are associated with cutting errors, and with shaping and handling errors.

OBJECT OF THE INVENTION

The object of the invention is to propose a solution enabling a composite material part to be fabricated that includes braided fibers having reinforced zones and without being dependent on the know-how of the operator performing the method.

SUMMARY OF THE INVENTION

To this end, the invention provides a method of fabricating a composite material part, in particular a link, the method comprising successive operations of applying reinforcing fiber layers that are braided around a mandrel over all or part of the length of the mandrel, the layers being superposed one on another, the method including a step of cutting an intermediate reinforcing fiber layer after it has been applied, a step of withdrawing a cut portion prior to applying the following braided layer, thereby locally building up an extra thickness of reinforcing layers on each portion of the cut layer that has remained in place, the extra thickness constituting local reinforcement of the part, and wherein resin is subsequently injected into the various braided layers prior to the resin being polymerized.

This method makes it possible to build up localized extra thicknesses of reinforcement in order to improve the mechanical strength of highly-stressed regions. The invention also makes it possible simultaneously to put into place and to shape the braid portions that constitute the reinforcement, thereby reducing or even eliminating geometrical dispersions in the reinforcing extra thicknesses.

BRIEF DESCRIPTION OF THE FIGURES

FIG. 3 is a perspective view of a mandrel covered in a first layer of braided reinforcing fibers.

FIG. 4 is a diagram of a braiding machine used for depositing reinforcing fiber layers.

FIG. 5 is a perspective view of the mandrel covered in the first braided reinforcing fiber layer and two protective annuluses.

FIG. 6 is a perspective view of the mandrel covered in the first braided fiber layer and an intermediate layer that is to be cut.

FIG. 7 is a perspective view of the mandrel covered in the first braided fiber layer and the intermediate braided fiber layer after it has been cut.

FIG. 11 is a perspective view showing one end of a finished link fabricated in accordance with the invention and in which said end constitutes a clevis formed in a reinforced portion.

FIG. 12 is a section view of the clevis of the FIG. 11 link showing the arrangement of the layers forming the local extra thickness in accordance with the method of the invention.

FIG. 13 is a perspective view of another type of link fabricated with the method of the invention.

DETAILED DESCRIPTION OF THE INVENTION

Figure 1:
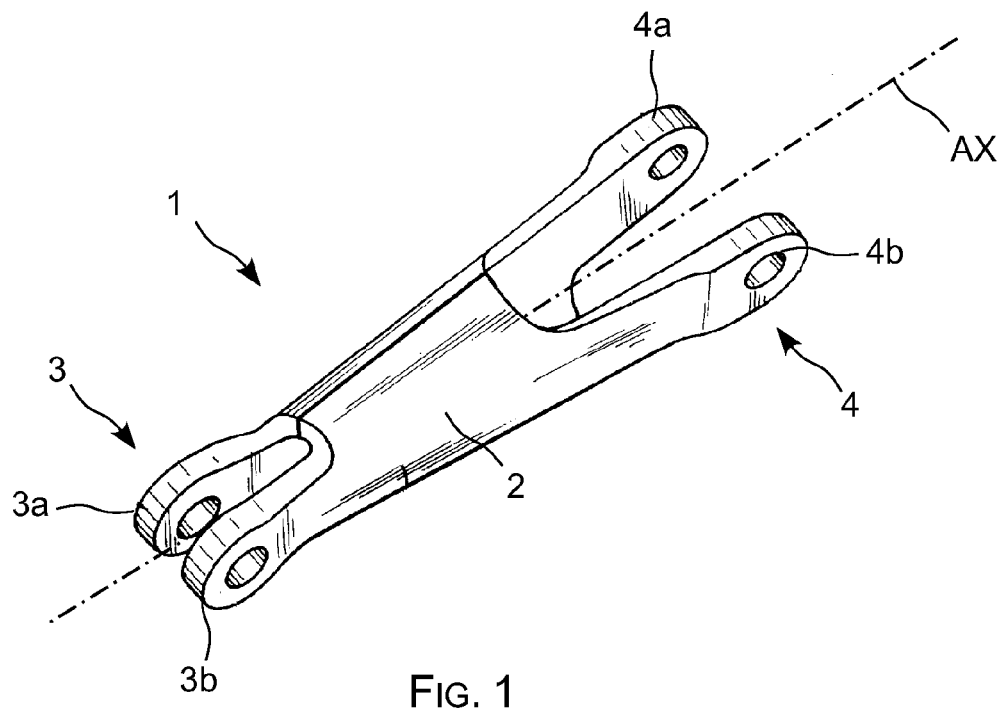
FIG. 1, described above, is an overall view of a prior art composite material link having two clevises.
Figure 2:
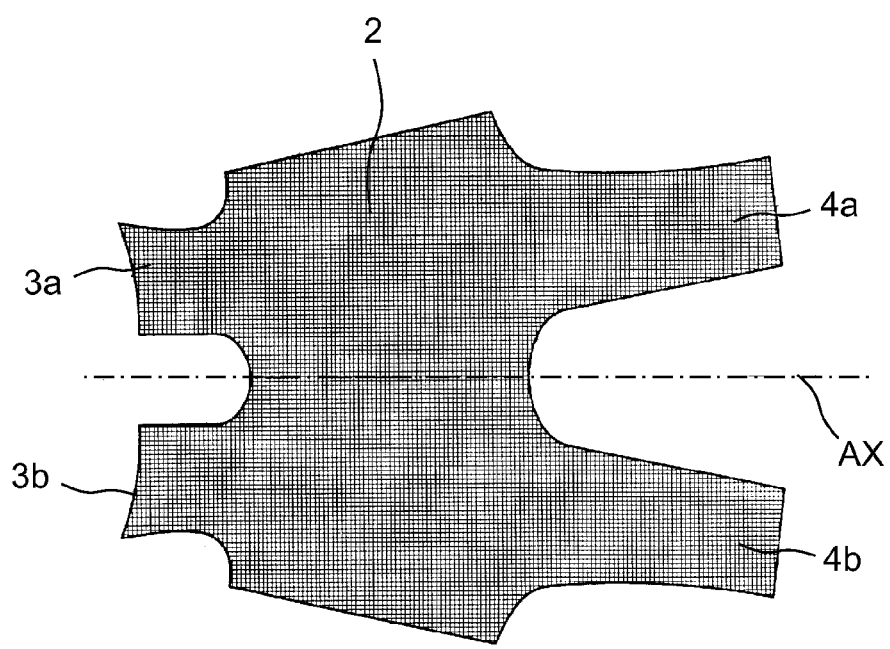
FIG. 2, described above, is a flat view of the piece of reinforcing fiber fabric used for fabricating the FIG. 1 link in a prior art method.

The idea on which the invention is based is to implement a method of fabricating a composite material part, such as a link, on the basis of operations of braiding successive reinforcing fiber layers, and in which local fiber extra thicknesses are made by cutting away and removing portions of one or more intermediate reinforcing fiber layers that are applied by braiding.

As shown diagrammatically in FIG. 3, initially a mandrel referenced 6 is provided, which mandrel is generally tubular in shape, and a first braided reinforcing fiber layer, referenced 7, is applied thereon, these fibers being carbon fibers, for example.

By way of example, the mandrel is made from preimpregnated reinforcing fiber layers applied on a support so as to constitute an assembly that is prepolymerized before the support is removed, so as to give it sufficient rigidity to carry the braided reinforcing fiber layers. The mandrel may thus be designed not to be removed from the link at the end of fabrication, but on the contrary to be incorporated therein permanently.

Braided fiber layers are applied using a braiding machine such as that shown in FIG. 4, where it is referenced 8. The machine 8 mainly comprises a ring 9 centered on an axis AX and carrying a series of reels of carbon fibers 11.

When the mandrel 6 is moved along the axis AX through the ring 9, the assembly being actuated by appropriate servo-control means, a sock of carbon fibers is braided around the outside face of the mandrel 6. The layer as braided in this way completely surrounds the mandrel 6, while also extending along its entire length.

After the first braided fiber layer 7 has been applied, two protective bands, referenced 12 and 13 in FIG. 5, are applied to the outside face of the layer 7, locally level with the cuts that are going to be made in another braided layer that is to be applied around the layer 7 over the entire length of the mandrel.

This other braided layer, constituting an intermediate layer referenced 14 in FIG. 6, is applied in the same manner as the first layer 6, i.e. with the braiding machine 8.

After being applied, this intermediate layer 14 is cut so as to remove a portion thereof, the cutting being along lines referenced 16 and 17 in FIG. 7. These lines of cut 16 and 17 are circular cuts, each extending in a plane normal to the axis AX of the mandrel 6, and they are spaced apart from each other along the axis.

These cuts 16 and 17 enable the intermediate layer to be split into three consecutive segments referenced 18, 19, and 20, each of which segments is tubular. The segments 18 and 20 correspond to the ends of the link that is being fabricated, while the segment 19 constitutes a central tubular portion that is to be removed.

As can be seen in FIGS. 5 and 7, the protective bands 12 and 13 are placed on the layer 7 in register with the subsequent cuts 16 and 17 through the layer 14.

In this example, given the circular shape of each of the cuts 16 and 17, each of the protective bands 12 and 13 is in the shape of an annulus.

Each protective band is made of a material that is suitable for not being damaged by the method used for making the cuts 16 and 17. In the example in the figures, the cuts are made by a method that uses a laser beam, such that the protective bands 12 and 13 may be made of copper so as to be effective in protecting the bottom layer 7 during cutting. It is difficult to cut copper with a laser because the beam is reflected for the most part and diffused around the point of impact.

It should be observed that these protective bands are optional, and that use thereof depends on the method and the settings used for cutting. For example, with a laser cutting method, the beam may be focused so as to perform cutting over a predetermined thickness or depth corresponding solely to the intermediate layer 14. Under such conditions, the protective bands 12 and 13 are not essential.

Figure 8:
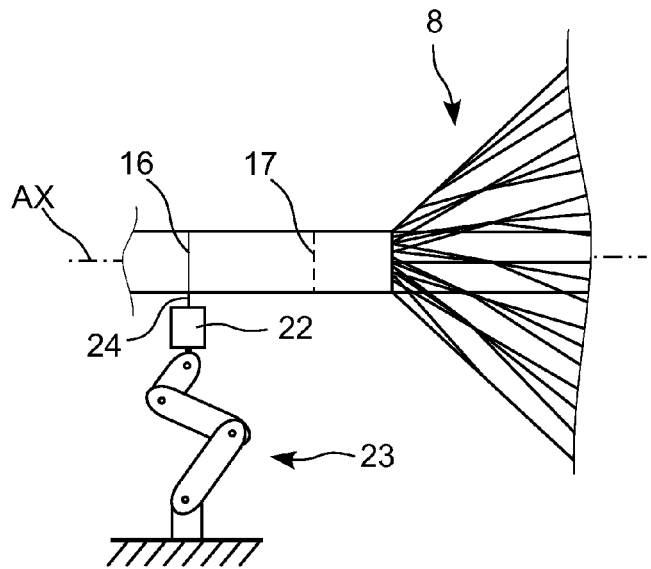
FIG. 8 is a diagrammatic view of an apparatus enabling the cutting to be performed by means of a laser beam.

The laser cutting may itself be performed by means of an installation of the kind shown in FIG. 8, in which the laser cutter tool 22 is carried by a robot arm referenced 23, this installation then being placed at the outlet from the braiding machine 8.

Under such conditions, all of the operations may be performed on a single installation in order to minimize handling, thereby serving both to reduce the cost of production and to increase the quality of fabrication.

The arm 23 is then controlled to move the tool 22 around the assembly constituted by the mandrel 6 and the layers 7 and 14, at a predetermined distance from its outside face, and while keeping the laser beam 24 oriented radially relative to the axis AX so as to make the first cut 16. The second cut 17 is made in analogous manner.

Figure 9:
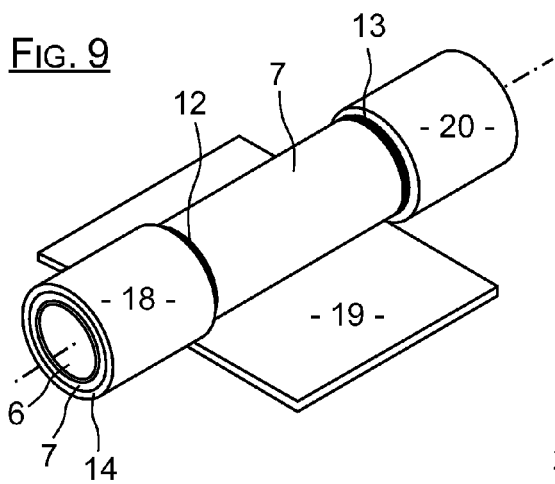
FIG. 9 is a perspective view showing the removal of a portion of the intermediate layer after cutting.

Once these two cuts have been made, the central segment 19 of the reinforcing fiber layer 14 may be withdrawn, as shown diagrammatically in FIG. 9. This may be performed manually by an operator, who then uses a sharp object or a laser to make a longitudinal cut in the tubular portion 19 in order to open it and remove it.

At this stage, and as shown in FIG. 9, the protective bands 12 and 13, if any were put into place, are then once more visible in part: each protective band in the form of an annulus then has one half that is trapped between the layer 7 and the layer 14, and another half that merely bears against the first braided layer 7.

Under such conditions and depending on circumstances, it is possible to withdraw the protective bands 12 and 13, or else to leave them permanently in place, before moving on to applying other layers.

Furthermore, it should be observed that prior to applying the layer 14, it is advantageous to make provision for applying a layer of adhesive or resin on the outside face of the first layer 7, in particular in the reinforcing portions 18 and 20 of the layer 14, which portions are to be kept in position after the cutting operation.

Once the portion 19 has been withdrawn, a new braided reinforcing fiber layer 26 is applied on the assembly. Under such conditions, and as shown diagrammatically in FIG. 10, the central portion of the part as obtained in this way is constituted by two thicknesses 7 and 26 of braided reinforcing fibers, while each end is constituted by three thicknesses 7, 14, and 26 of braiding reinforcing fibers.

Figure 10:
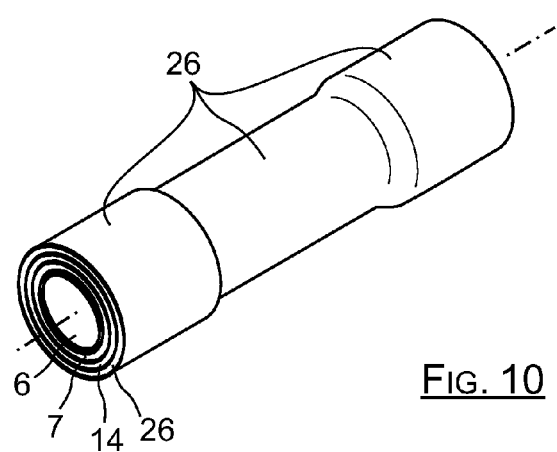
FIG. 10 is a perspective view of the mandrel carrying the first layer together with the intermediate layer and a final outer reinforcing fiber layer.

After the various reinforcing fiber layers have been applied, the FIG. 10 part is placed in a mold in order to inject resin into the various braided layers, the resin being selected to be compatible with the resin used for fabricating the mandrel 6, where appropriate. Once the resin has been injected, the mold is controlled so as to produce a heating cycle in such a manner as to cause the resin to be polymerized.

The blank that is obtained from the mold is then substantially of the general shape shown in FIG. 10, and several machining operations may then be performed, e.g. at each of its ends in order to make the finished part.

Thus, the reinforcement is produced locally by braiding directly during the cycle of fabricating the part, thereby considerably simplifying the preparation of the part. The method of the invention eliminates having recourse to reinforcing elements that need to be prepared before braiding the part. The cutting of the reinforcement is performed directly on the preform while it is being prepared. This serves to limit handling and to obtain better control over the orientation of fibers on the preform.

In addition, the nature and the mechanical characteristics of the reinforcement as made in this way are close to those of the structural layers of the part, so there are no problems associated with major differences between the stiffnesses of the reinforcing layers and of the structural layers.

In the example of FIGS. 1 to 10, the raw part is described as being fabricated on a mandrel that is tubular so as to illustrate the method of the invention in schematic manner, however in practice, the mandrel may be of any shape, and in particular it may have a section that varies along the axis AX.

Furthermore, in the example described with reference to FIGS. 1 to 10, the layers that are cut are braided around the mandrel over its entire length. However, in general, the cut layers may equally well be braided over only a fraction of the length of the mandrel, this fraction corresponding to the zones that remain in place after cutting.

In order to make a link that presents an end in the form of a clevis, the mandrel advantageously presents a section that is substantially rectangular or square at the end in question, and a section that is circular or more or less constant in its middle region along the axis AX.

Under such circumstances, after applying braided layers and after cutting away some of the intermediate layers in order to form local extra thicknesses of reinforcement, in a manner analogous to the description given relative to FIGS. 1 to 10, the part is likewise placed in a mold for resin to be injected therein and then polymerized so as to form a rigid raw part.

Milling and drilling operations are then performed so as to give the clevis its final shape, as shown in FIGS. 11 and 12, where the clevis is referenced 27.

The milling operation then consists in removing material from the top and bottom walls at the end of the raw part so as to separate the prongs 28 and 29 of the clevis 27, which prongs correspond to two opposite sides of the rectangular end section.

In addition, holes are drilled in each of the prongs, these holes being referenced 31 and 32, prior to mounting respective metal bushings in each of these holes.

As can be seen in FIG. 12, each prong of the clevis then has a series of intermediate braided layers that are not present in the central region of the link, thereby enabling the prong to be thicker than the tubular central region of the link.

The intermediate layers that are shown explicitly by lines in FIG. 12 are three in number and they are referenced 14a, 14b, and 14c. As for the other layers, which extend around the mandrel but over its entire length, they are not shown explicitly in FIG. 12 so as to make the figure easier to read.

As shown in FIG. 13, the method of the invention makes it possible to fabricate links presenting complex general shapes including zones that are reinforced, because the method can be adapted to a mandrel of section that may vary considerably along the axis AX. This applies to the link shown in FIG. 13, which corresponds to a landing-gear rocker lever.

More particularly, the rocker lever 33 is generally tubular in shape and essentially comprises a front end and a rear end, each having two through bearings referenced 36-39, and it further includes a lug 41 between its central region and its rear end.

The rocker lever may be made in accordance with the invention, using a mandrel of appropriate shape, i.e. having a central region of constant circular section and ends that have sections of larger dimensions and that are rectangular in order to form the bearings and the lugs at the ends.

In this example, provision is made to provide extra thicknesses in the front and rear portions while applying braided fiber layers so as to form zones that are reinforced in register with the bearings and the top lug.

In general, it should be observed that in the example shown in FIGS. 1 to 10, the method is implemented in order to insert a single intermediate layer, a portion of which is withdrawn after cutting. However, in the example of FIGS. 11 and 12, the invention relates equally well to a solution in which a conventional braided layer and then an intermediate braided layer that is cut so as to enable a portion thereof to be removed continue to be applied in alternation until the desired thicknesses have been obtained.

Furthermore, in these two examples, the intermediate layers are applied one by one, however it is also possible to deposit one or more intermediate layers in succession, which layers may then be cut together in a single operation, e.g. prior to applying another braided layer that is to cover the entire part without being cut.

The invention provides the following advantages in particular.

By means of the invention, it is possible to perform accurate cutting of each intermediate braided layer after it has been applied, so as to build up localized extra thicknesses reinforcing the zones that are the most stressed, but without any need to perform manipulation after cutting.

Thus, and in particular, the assembly constituted by the braided layers deposited on the mandrel presents an outside shape that is better controlled, and that therefore does not present any difficulty when it is to be put into the mold. Since the reinforcing fiber portions are deposited by braiding, they necessarily follow the bulging of the link in the reinforced zone, and they therefore do not form any folds that might harm the shape of the part and also its mechanical strength.

In particular, the laser cutting method enables a cut to be obtained that is sharp, accurate, repeatable, and suitable for automation, which cut does not damage the ends of the cut fibers. Other cutting methods may also be implemented, providing they enable these criteria to be complied with to a satisfactory extent. Thus, such cutting could be performed mechanically with a rotary disk type blade, by means of a cutting water jet, or indeed by heating.

The method of the invention enables fabrication to be performed quickly, reproducibly, and practically without assembly, and is capable of building up a fiber structure of varying thickness. In addition, the braided portions that form the extra thickness present properties that are close to the properties of the other braids, thereby enabling a link to be built up that is homogenous, thereby presenting increased mechanical strength.

Numerous variants may be applied to the above-described principle. Firstly, cutting may be performed mechanically (cutter, scissors), which is very simple to perform but runs the risk of disturbing the organization of the fibers in the vicinity of the cut. It is also possible to cut the braided layer with a water jet. Nevertheless, it is appropriate to ensure that the preform dries out fully before it is impregnated with resin.

Protection may be omitted if the cutting operation is sufficiently well controlled to avoid damaging the underlying braided layer, e.g. by performing cutting by means of a laser that is focused very accurately so as to cut through only a certain thickness of the layer that is to be cut. If protection is found to be necessary, it is preferable to use a band of copper sheet, since that material is difficult to cut by laser, given that the major portion of the beam is reflected and diffused around the point of impact. The protective band may optionally be left in place if it does not affect the mechanical strength of the dimensions of the finished part.

It is also possible to cut through a plurality of layers at the same time, if it is necessary to deposit a thick layer of reinforcement on the mandrel.

The laser is preferably mounted at the end of a manipulator arm placed close to the braiding machine so as to make it possible to make the cut directly on the mandrel while it is still mounted on the carriage of the braiding machine.

The invention is not limited to the above description, but on the contrary it covers any variant coming within the ambit defined by the claims.

In particular, although it is stated that the method of the invention is particularly adapted to producing parts of non-constant thickness, the method of the invention may also be used for making repairs or adding external reinforcement on parts that have already been produced, with such parts then acting as the mandrel.

Although the cuts shown are cuts that extend around the mandrel along a circle, it is naturally possible to make cuts along paths of arbitrary shape. In addition, although the reinforcement that is shown is annular, thereby enabling it to be held naturally around the mandrel, cuts could be made while leaving only a portion of the braided layer that does not constitute a complete turn around the part, said portion then constituting a kind of local patch. Provision should then be made for means that hold the patch on the remainder of the preform. For this purpose, it is possible to spray resin on the preform prior to braiding the layer that is going to be cut, so that the patches stay in place after the layer has been cut. This method is particularly suitable for providing the preform with local reinforcement, e.g. over a projecting portion of the part that needs to be drilled in order to receive a hinge pin.

Although it is stated that the second layer covers the entire mandrel, it is possible, where appropriate, to make do with braiding that is only local, e.g. covering only the portion of the mandrel that is to receive the reinforcement.

Advantageously, the bottom layer and the top layer are continuous, thereby improving the impact strength of the part and its ability to withstand friction.

In a variant, two layers are braided in succession and then cut simultaneously in order to form the braided local reinforcement.

In another variant, a plurality of continuous layers may be braided in succession before braiding one or more layers for cutting.

What is claimed is:

1. A method of fabricating a composite material part, in particular a link, the method comprising successive operations of:
    applying reinforcing fiber layers that are braided around a mandrel over all or part of the length of the mandrel, the layers being superposed one on another,
    cutting an intermediate reinforcing fiber layer after it has been applied,
    withdrawing a cut portion prior to applying the following braided layer, thereby locally building up an extra thickness of reinforcing layers on each portion of the cut layer that has remained in place, the extra thickness constituting local reinforcement of the part, and
    subsequently injecting resin into the various braided layers prior to the resin being polymerized in order to prepare a blank.

2. A method according to claim 1, including, prior to applying each intermediate layer for cutting, applying a protective band arranged along the outline of the cutting so as to protect the previously-applied braided layer during the operation of cutting the intermediate layer.

3. A method according to claim 1, wherein the cutting is performed with equipment including means for emitting a laser beam.

4. A method according to claim 1, wherein an adhesive or resin type substance is applied prior to applying each intermediate layer for cutting in order to ensure that the cut portion of the intermediate layer that remains in place is held in position during the following operations.

5. A method according to claim 1, including an operation of cutting through a plurality of intermediate layers that have been deposited in succession.

6. A method according to claim 1, wherein layers for cutting and layers for completely covering the mandrel are made in succession.

7. A method according to claim 1, for fabricating a composite material link including one or more bearings and/or one or more devises or lugs, and wherein the reinforcing zones are situated at each bearing and/or each clevis or lug.

* * * * *